United States Patent
Lee et al.

(10) Patent No.: US 8,483,126 B2
(45) Date of Patent: Jul. 9, 2013

(54) MULTI-NETWORK MOBILE COMMUNICATIONS SYSTEMS AND/OR METHODS

(75) Inventors: John C Lee, Eye (GB); Geoffrey T Haigh, Reading (GB); David E Hughes, Ipswich (GB); Andrew R J Cook, Manningtree (GB)

(73) Assignee: British Telecommunications PLC, London (GB)

( * ) Notice: Subject to any disclaimer, the term of this patent is extended or adjusted under 35 U.S.C. 154(b) by 1000 days.

(21) Appl. No.: 12/299,979

(22) PCT Filed: Apr. 18, 2007

(86) PCT No.: PCT/GB2007/001414
§ 371 (c)(1),
(2), (4) Date: Nov. 7, 2008

(87) PCT Pub. No.: WO2007/135357
PCT Pub. Date: Nov. 29, 2007

(65) Prior Publication Data
US 2009/0116466 A1    May 7, 2009

(30) Foreign Application Priority Data

May 23, 2006  (EP) ..................................... 06252679

(51) Int. Cl.
*H04W 4/00*    (2009.01)

(52) U.S. Cl.
USPC .......................................... 370/328; 370/401

(58) Field of Classification Search
None
See application file for complete search history.

(56) References Cited

U.S. PATENT DOCUMENTS

| | | |
|---|---|---|
| 6,188,756 B1 | 2/2001 | Mashinsky |
| 6,674,746 B1 | 1/2004 | Lamarque, III |

(Continued)

FOREIGN PATENT DOCUMENTS

| | | |
|---|---|---|
| EP | 0 766 490 | 4/1997 |
| EP | 1 689 206 A1 | 8/2006 |

(Continued)

OTHER PUBLICATIONS

U.S. Appl. No. 12/299,969, Lee et al., filed on Nov. 7, 2008.

(Continued)

*Primary Examiner* — Kevin C Harper
(74) *Attorney, Agent, or Firm* — Nixon & Vanderhye PC

(57) ABSTRACT

A mobile communications handset (12) is capable of connection through two different networks (2, 27). When it is out of contact with its preferred local wireless access system (27), the handset will seek a hand-over to the cellular network (2), and will become registered as a "roaming" handset currently connected to the cellular network (2). The cellular network (2) reports this location information to the call server (28), as it would to the HLR of any normal visiting handset, so that incoming calls to the PSTN (6) destined for the user (12) can be routed by way of the cellular network. Outgoing calls are handled as conventional cellular telephony calls. When contact with a local wireless access system (27) is re-established, the contact information is passed to the call server 28, which reports to the cellular network (2) that a handover has occurred. An interface between the call server (28) and cellular network (2) is configured such that the call server (28) emulates a base site controller of the cellular network (2). The cellular network therefore operates conventionally, with the handset (12) logged as operating through this quasi-base site controller. However, the cellular system would continue to register the presence of the handset as co-operating with the quasi-base station (28), even though it would have no visibility of most calls being made to and from the handset (12). This avoids the cellular system (2) attempting to seize control of the handset through a normal cellular base station (21).

12 Claims, 10 Drawing Sheets

U.S. PATENT DOCUMENTS

Figure 1:
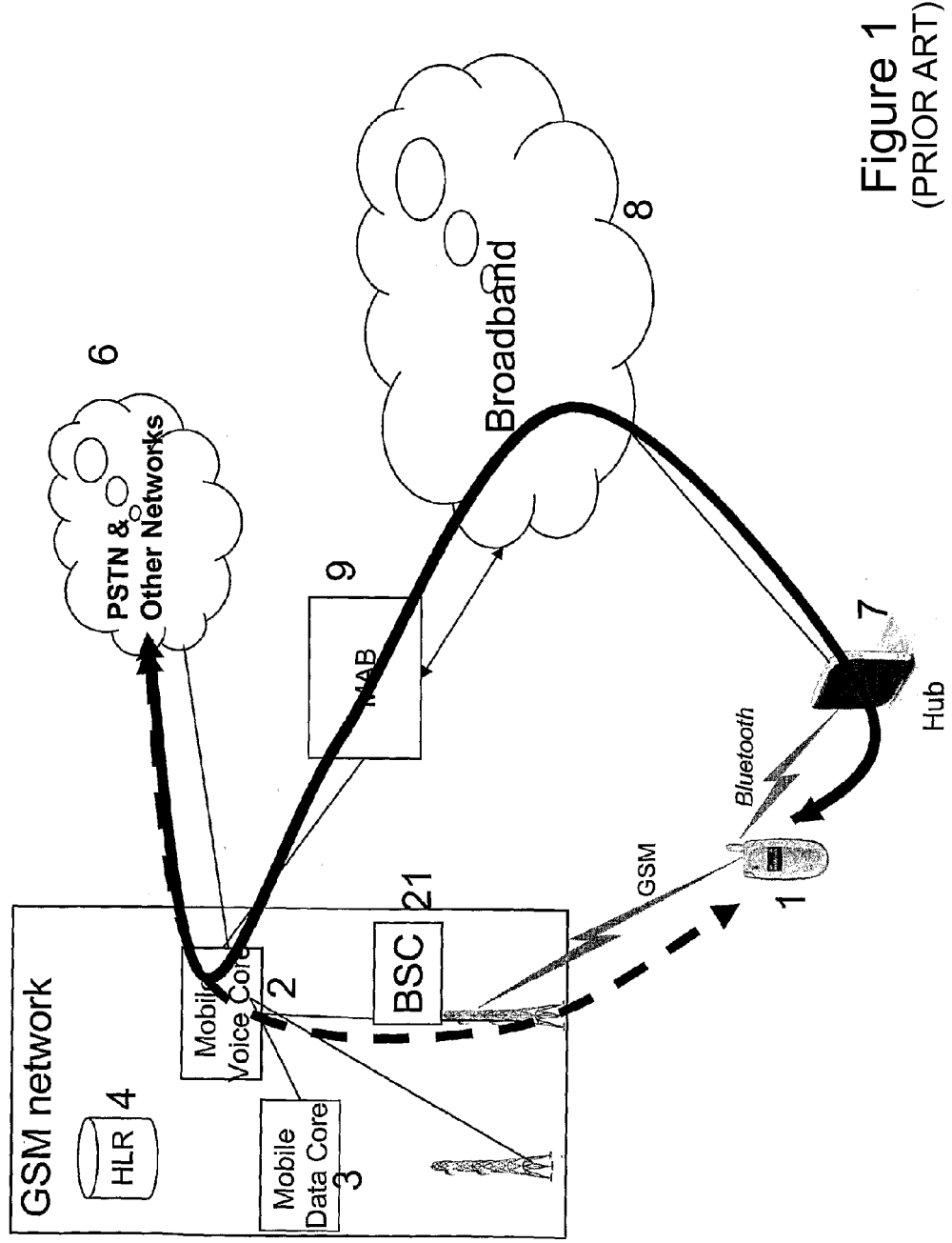

| | | | |
|---|---|---|---|
| 6,853,851 B1 | 2/2005 | Rautiola et al. | |
| 6,922,559 B2* | 7/2005 | Mohammed | 455/421 |
| 7,047,036 B2* | 5/2006 | Shaheen et al. | 455/552.1 |
| 8,005,070 B2* | 8/2011 | Marsh et al. | 370/352 |
| 2001/0053213 A1 | 12/2001 | Truong et al. | |
| 2002/0022483 A1 | 2/2002 | Thompson et al. | |
| 2002/0077129 A1 | 6/2002 | Kikuta et al. | |
| 2002/0085516 A1 | 7/2002 | Bridgelall | |
| 2002/0147008 A1* | 10/2002 | Kallio | 455/426 |
| 2003/0023691 A1 | 1/2003 | Knauerhase | |
| 2003/0087629 A1 | 5/2003 | Juitt et al. | |
| 2003/0119489 A1 | 6/2003 | Mohammed | |
| 2003/0206619 A1 | 11/2003 | Curbow et al. | |
| 2004/0008645 A1* | 1/2004 | Janevski et al. | 370/331 |
| 2004/0066927 A1 | 4/2004 | Horvath et al. | |
| 2004/0072593 A1* | 4/2004 | Robbins et al. | 455/560 |
| 2004/0213208 A1 | 10/2004 | Baratz et al. | |
| 2005/0086346 A1 | 4/2005 | Meyer | |

FOREIGN PATENT DOCUMENTS

| | | |
|---|---|---|
| EP | 1 845 674 A1 | 10/2007 |
| EP | 1 860 905 A1 | 11/2007 |
| EP | 1 912 401 A1 | 4/2008 |
| WO | 0 766 490 A2 | 4/1997 |
| WO | 00/22802 A2 | 4/2000 |
| WO | 02/07396 A1 | 1/2002 |
| WO | 02/093811 A2 | 11/2002 |
| WO | 03/021900 A1 | 3/2003 |
| WO | 03/061177 | 7/2003 |
| WO | 03/061177 A2 | 7/2003 |
| WO | 2004/082219 | 9/2004 |
| WO | 2004/082219 A2 | 9/2004 |

OTHER PUBLICATIONS

U.S. Appl. No. 12/280,446, Hughes et al., filed on Aug. 22, 2008.
European Search Report dated Jul. 12, 2006 in EP 06 25 1293.
European Search Report dated Oct. 18, 2006 in EP 06 25 2679.
European Search Report dated Sep. 26, 2006 in EP 06 25 2678.
European Search Report dated Dec. 7, 2006 in EP 06 25 2680.
European Search report dated Jun. 21, 2006 in EP 06 25 2051.
Haase O., et al., "Multi-protocol profiles to support user mobility across network technologies," Mobile Data Management, 2004, Proceedings, 2004 IEEE International Conference on Berkeley, CA, US, Jan. 19-22, 2004, Los Alamitos, CA, IEEE Comput. Soc., US, Jan. 19, 2004, pp. 100-105, XP010681048, ISBN: 0-7695-2070-7.
European Search Report dated May 23, 2007 in EP 06 25 5208.
CISCO Systems: "CISCO Aironet 1100 Series Access Point Installation and Configuration Guide," Internet Citation, Oct. 1, 2002, XP002381713.
International Search Report for PCT/GB2007/001404, mailed Jul. 27, 2007.
International Search Report for PCT/GB2007/000469, mailed Mar. 29, 2007.
International Search Report for PCT/GB2007/001414, mailed Jul. 31, 2007.

* cited by examiner

MULTI-NETWORK MOBILE COMMUNICATIONS SYSTEMS AND/OR METHODS

This application is the U.S. national phase of International Application No. PCT/GB2007/001414 filed 18 Apr. 2007 which designated the U.S. and claims priority to EP 06252679.3 filed 23 May 2006, the entire contents of each of which are hereby incorporated by reference.

This invention relates to mobile communications systems. "Mobility" in this context means the provision of the capability for a user to make contact with a communications network from a variety of different locations, so that the user can exchange information with other parties. The information may be in the form of speech, as in conventional telephony, or data representing visual material such as text or graphics, or a combination such as audio-visual material. Communication may be one-way or two-way. If a wireless connection is used and the terminal equipment is sufficiently portable, a mobile user may exchange information with other parties whilst he is in motion.

Many mobile communications systems have been developed, ranging from very large scale systems using satellites, to termination points in the fixed network with provision for a user to connect a terminal (often a laptop computer) thereto, to gain access to the network by entering a user identity and network access code. Intermediate between these extremes fall systems such as the various cellular telephone networks, wireless local area networks (WLAN) e.g. using the "WiFi" (IEEE 802.11) standard, short-range systems that operate in ad hoc networks such as "Bluetooth"®, and "cordless" arrangements in which a single short-range wireless base station, when connected to the public switched telephone network (PSTN), allows a user with a wireless handset to move around within range of the base station.

All of these wireless systems allow a user terminal to communicate with a network without the need to form a physical "wired" connection, whether using real wires or optical fibres. This simplifies installation of equipment, as a single wireless hub can readily serve several different user terminals at the same time, or new terminals can replace older ones without the need for complex installation. Wireless connection also allows a user more flexibility in choice of where the terminals may be located, and in particular several relatively widely spaced terminals can be accessed using the same hub without the need for lengthy wiring runs.

In larger systems more than one fixed base station may be required in order to give adequate coverage, with the base stations co-operating to allow a given user terminal to be recognised by any of the base stations when it first attempts to establish contact or moves from the range of one of the base stations into the range of another. Therefore, a communications session is established between a given user terminal and the underlying network to which the base station is connected, and the session may be continued through a second base station should the terminal move out of range of the one it first makes contact with.

Generally, a user has to select the type of network most suitable to his current requirements: for example a cellular telephone may be appropriate for making a voice call in the street, but the bandwidth is limited and call quality is relatively poor compared to a high-bandwidth "WiFi" wireless access connection, which may be more appropriate if there is much data to be handled and Wi-Fi coverage is available.

In general, a user needs to have a separate user identity, and a separate terminal, for each network he subscribes to. This can be inconvenient both for the user in question and for anyone trying to contact him. A number of attempts have been made to ameliorate this. For example, dual-mode handsets exist, which are capable of operating on more than one type of connection, although they need separate subscriptions for each mode. Systems are now coming into existence in which a handset may register with the local wireless system when such a system is available with which the handset is compatible, whilst when such a system is not available it registers directly with a cellular network. The local wireless system has an interface with the cellular network arranged such that the local wireless system emulates a base station of the cellular network. This allows handover to be performed during a call, using the cellular switching function of the cellular network, so that incoming calls can be routed to the handset even when it is connected to the local wireless network.

The ability for a mobile user to initiate a communications connection using such a dual mode handset is relatively straightforward, requiring only that the user can be identified as authorised to use the network facilities requested. Establishing a connection to such a user (i.e. an incoming call) is more complex, as the user's location, and the network to which he is connected, first needs to be determined. Various systems are known for locating a user in a single network, particularly a cellular network, and "roaming" arrangements between network operators exist to allow a user's location to be identified when connected to any network which is party to such an a agreement. However, such arrangements are only suitable for arrangements between similar networks.

A system is also known in which a user can operate in either of two systems, one being preferred over the other but having more limited coverage. Transfers between the two systems are handled using the location and handover processes of the more widely available system. However, this has limitations as the more generally available system is likely to be less specialised, and this may limit the functions available if calls have to be processed by that system. An example of this type is disclosed in United States patent application 2003/0119489, in which calls directed to a subscriber of a cellular network are diverted from a cellular network to a fixed (PSTN) line when a location update from the terminal indicates that the terminal is within range of a local wireless access point connected to the fixed line. It should be noted that location update and call handling are both handled by the cellular network.

Figure 2:
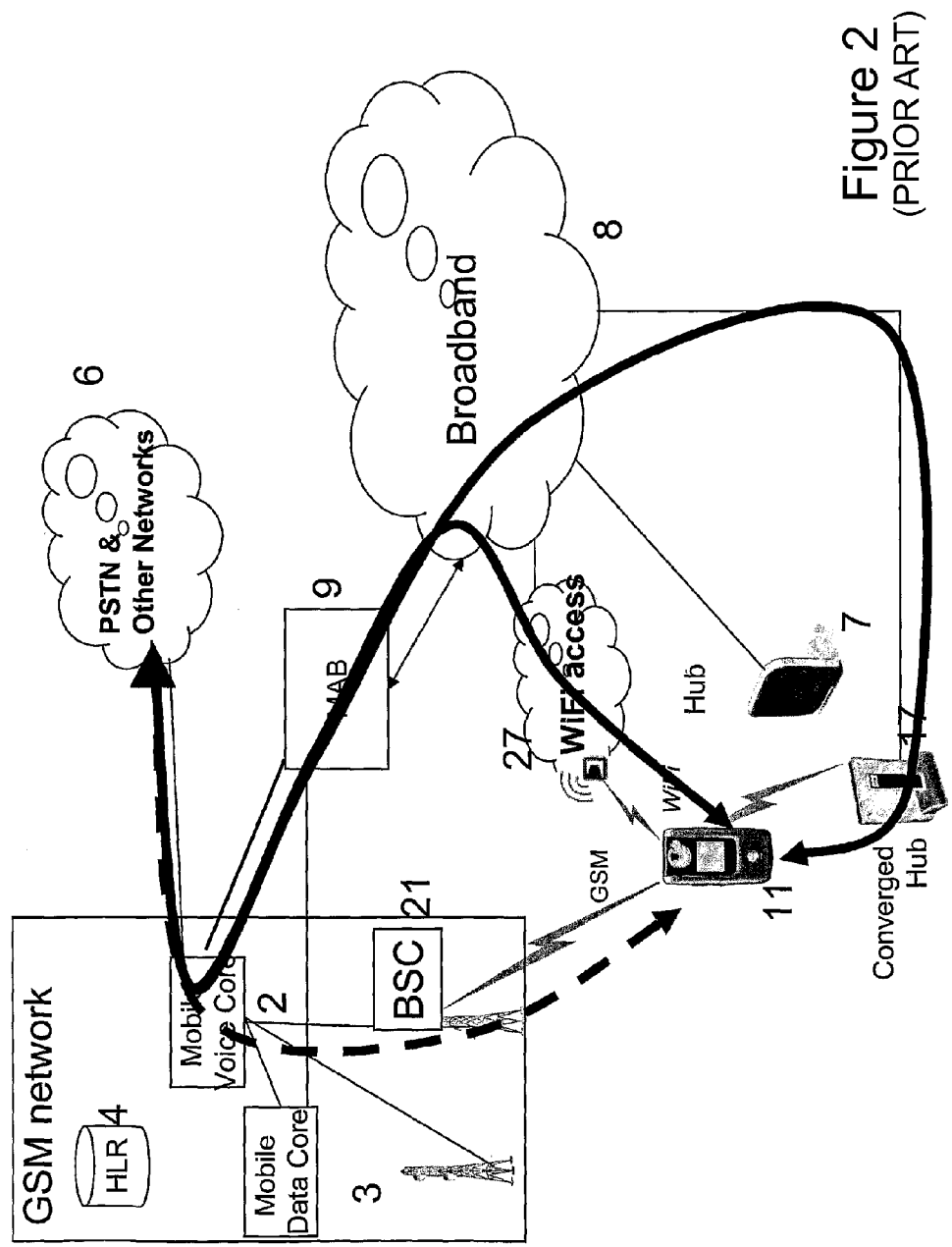
Figure 3:
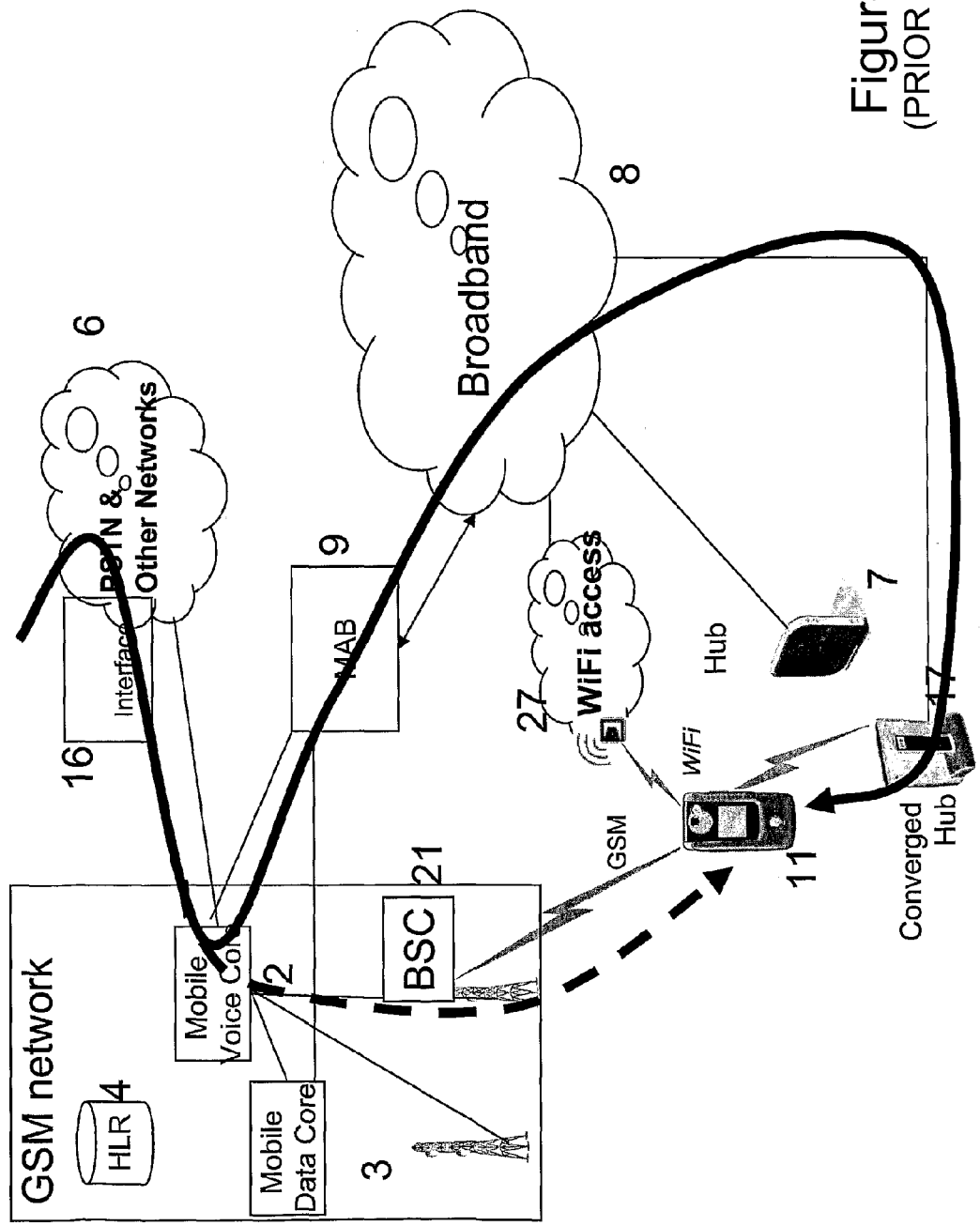
Figure 4:
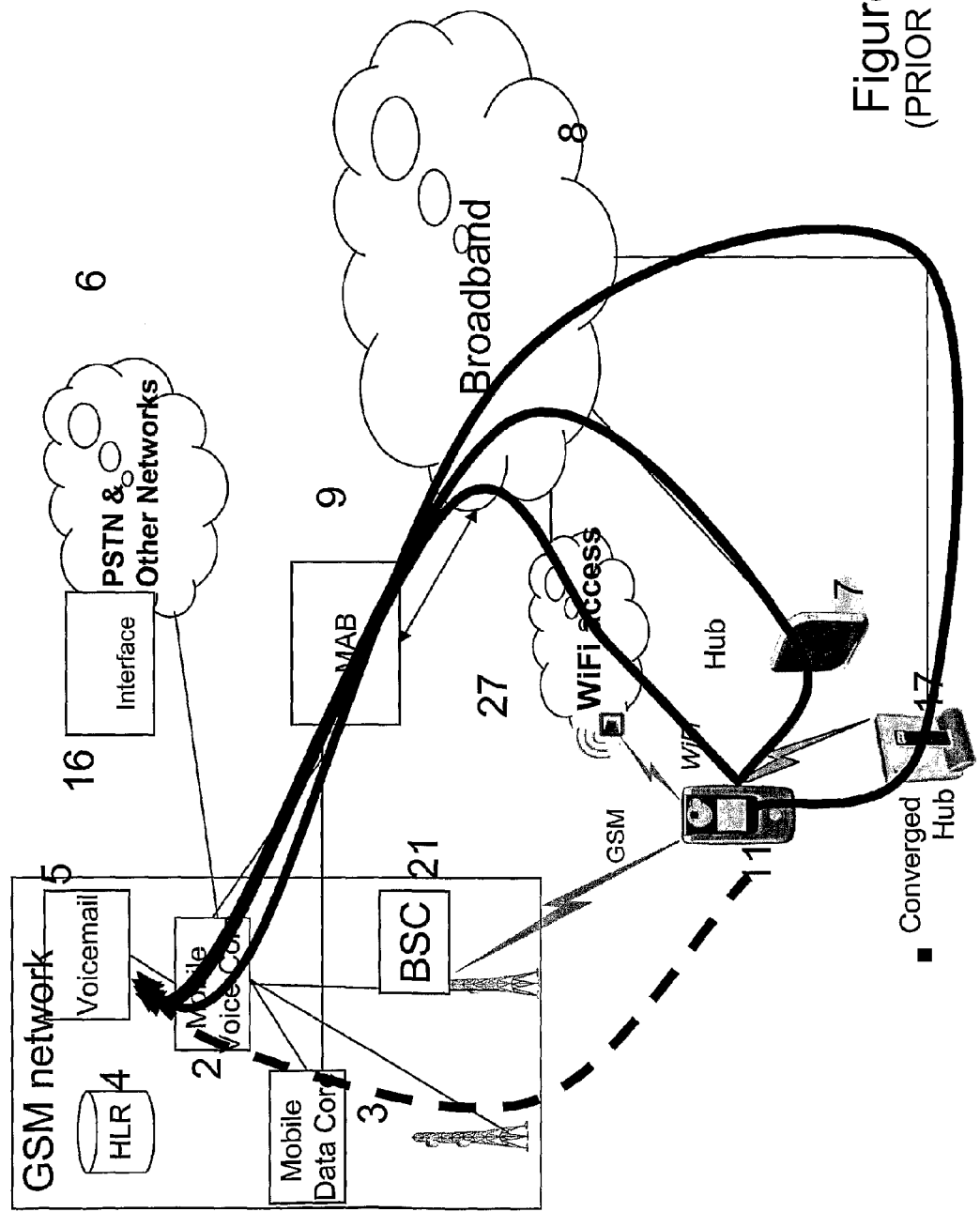
Figure 5:
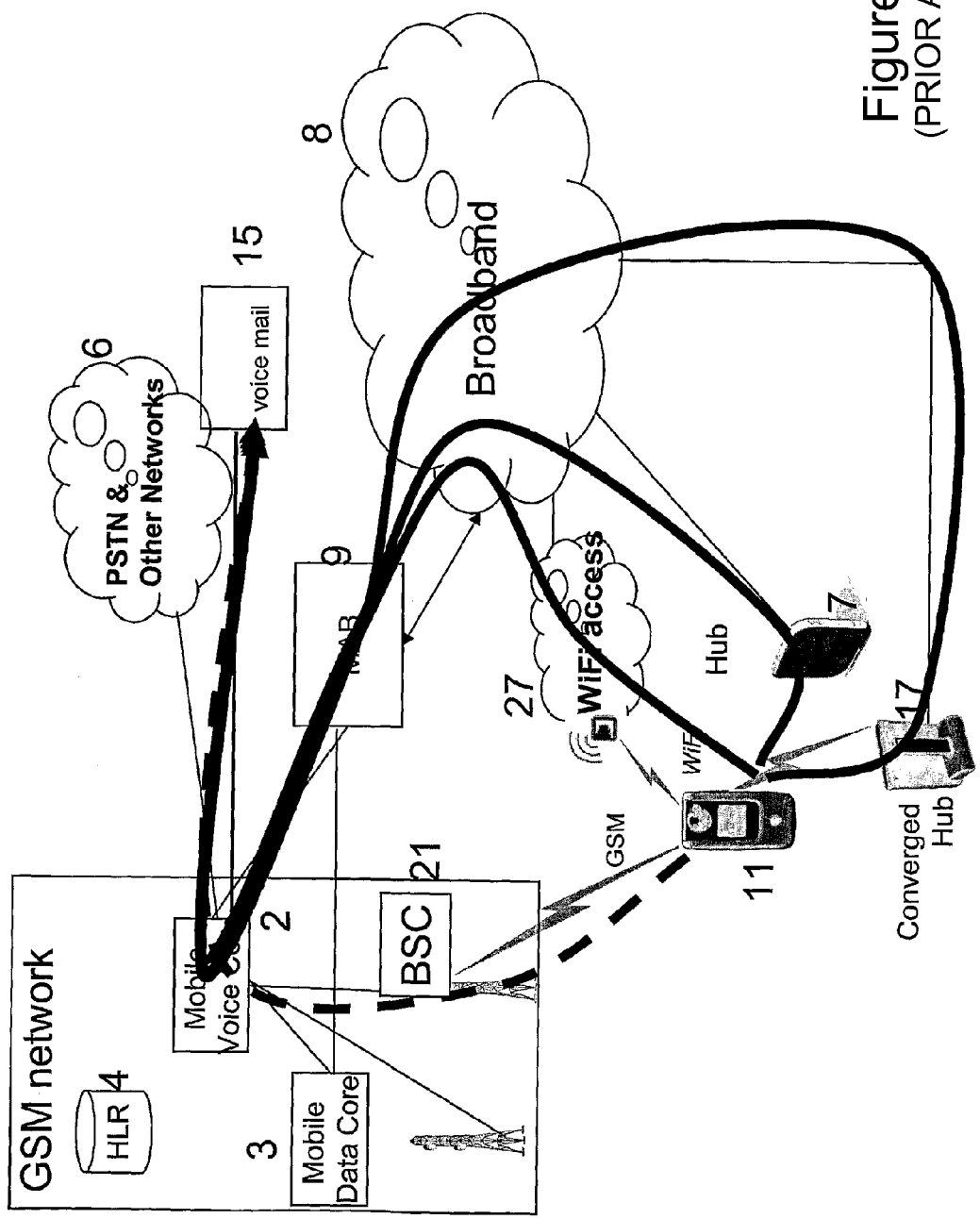

A number of features of such prior art systems are illustrated in FIGS. 1 to 5 of the accompanying drawings, in which:

FIG. 1 is a schematic diagram illustrating the operation of an existing dual-mode system, illustrating how a call is connected when operating in a first, local hub, mode and in a second, cellular, mode FIG. 2 is a schematic diagram illustrating another existing dual-mode system, showing its operation in three different modes FIG. 3 is a schematic diagram illustrating the operation of a third prior art system, illustrating how a call is connected on this system when operating in a first, local hub, mode and a second, cellular, mode FIG. 4 is a schematic diagram illustrating the operation of a first voicemail retrieval service in the existing dual-mode system of FIG. 3 when operating in various modes FIG. 5 is a schematic diagram illustrating the operation of a second voicemail retrieval service in the existing dual-mode system of FIG. 3 when operating in various modes FIG. 6 to 10 illustrate embodiments of the invention, and will be discussed later.

In the existing dual-mode system illustrated in simplified form in FIG. 1, a handset 1 is shown as capable of connection to the GSM network 2, or to a hub 7 by way of a short range connection system. The local wireless access may use any suitable means, such as the WiFi (IEEE 802.11) standard, an ad hoc low power network system such as "Bluetooth"®, or using the same cellular telephony protocols as the public network 2, 4, 21, but using a reserved frequency band not available for general use by the cellular operator 2.

The cellular system 2 has a data server 3 for handling data (e.g. using the GPRS standard), and a home location register 4 as already discussed, and is connected to the PSTN 6. The handset 1 is arranged to connect directly to the more widely available service (viz. GSM) only if no other service is available. The hub 7 is also connected to the GSM network 2, and so to the PSTN 6, by an "Internet" connection 8 to a mobile access bridge 9. As shown in FIG. 1, when the handset 1 is in communication with the hub 7, calls are routed to and from the PSTN by way of the hub 7, internet connection 8, mobile access bridge 9 and the cellular network 2. As also shown in FIG. 1, when no communication is possible with a hub 7, the handset 1 initiates communication with the PSTN 6 directly by way of the cellular network 2. (In this, and all other figures, connection via the cellular network is shown by dashed lines, whereas connection by local wireless access system is shown by solid lines).

The mobile access bridge 9 emulates a base station of the cellular network, and handovers can be made between it and a real base station in the same way as between two real base stations. When a handset establishes communication with a wireless hub 7, the mobile access bridge 9 reports this to the mobile network 2 which records the location of the handset as being attached to the mobile access bridge 9, instead of to a base site controller 21 of the cellular network. Incoming calls are routed by the MSC 20 to the base site controller 21 or mobile access bridge 9 according to the information currently held by the network. The call handling process in the cellular network 2 is the same in each case—the mobile access bridge 9 interacts with the MSC 2 in the same way that a normal BSC does. This use of emulation allows the service to be provided without the need for the cellular network 2 to be modified to handle handovers between different operating systems (e.g. between GSM and WiFi)

A more complex prior art system is illustrated in FIG. 2. This differs from the system shown in FIG. 1 in a number of respects. The handset 11 is enabled for wireless internet access through three different routes: the hub 7, a second hub 17, and by way of a wireless local area network system 27. A second difference is that the mobile access bridge 9 has an interface with the data handling system 3 of the cellular network, allowing data as well as voice to be carried by this route.

FIG. 2 illustrates how calls may be connected using this system through the second hub 17, through the WLAN 27, or through the cellular system 2, according to the availability of access by these routes. The processes are similar to those of FIG. 1 and need not be described in detail.

FIG. 3 is a schematic diagram illustrating the operation of a third prior art system. This differs from the system of FIG. 2 in the provision of an interface 16 in the PSTN 6. This is provided so that a directory number associated with the PSTN 6 can be used, rather than with the cellular network 2. A number translation facility in the interface 16 allows calls for terminals with such numbers to be routed via the GSM network. FIG. 3 illustrates how a call is connected when operating in the local hub mode and in the cellular mode respectively. It will be seen that apart from the number translation function allowing calls to enter the system via the PSTN 6 the operation is similar to that of FIG. 3. Outgoing calls may be handled by the cellular system in the same way as in FIG. 1 and FIG. 2, without the involvement of the PSTN 6.

Most cellular networks include a voice mail system 5, as depicted in FIG. 4. If a call is made to the user's PSTN number, and diverted to the cellular system 2, but is then not answered, the cellular system may in turn divert the call to the voicemail system. FIG. 4 depicts the retrieval of a message from a voice mail system 5 forming part of a system otherwise similar to that shown in FIG. 3, although the same principles would apply equally to the other prior art types shown in FIGS. 1 and 2. Messages left in the user's mailbox 5 may be retrieved using the cellular connection, or through a wireless internet connection using a hub 7,17 or WLAN connection 27, according to the current connections available to the user terminal 11. In both these latter cases connection is via the internet 8 and the mobile access bridge 9

In the arrangement shown in FIG. 5, voicemail provision 15 is associated with the PSTN 6 rather than the cellular network. When a call made to the user's PSTN number is not answered, the cellular system 2 reports the call failure to the PSTN 6, which diverts the call to the voicemail system 15. Retrieval, like other calls, is routed by way of the cellular system 2. FIG. 5 illustrates such retrieval when the handset 11 is connected to the cellular system 2 directly, using a hub 7, 17 or using a wireless LAN 27. Except for the consequences of the location of the voice mailbox, the routings are similar to those for FIG. 4.

All of these prior art arrangements require the involvement of the cellular network 2 in the routing of calls, whether or not the handset is currently connected to the cellular network 2. If the handset has a directory number associated with the cellular network, all incoming calls directed to the handset through the public switched telephone network (PSTN) 6 are directed first to the cellular network, which routes the call via the base site controller 21 or mobile access bridge 9 currently recorded in the home location register 4 for that handset. It will be noted in particular that the arrangements of FIGS. 3 and 5 require the cellular network 2 to be involved in the routing of calls between the broadband connection 8 and the PSTN 6, although the call otherwise makes no use of the cellular network. This involves the use of resources in the cellular system. Thus the service provided to the user is constrained by any inherent limitations that the cellular service may have. It is desirable for a direct connection to be available between the PSTN and the broadband system, so that any constraints on functionality or capacity of the cellular network system do not affect the availability of the service except when the cellular connection is actually required.

These systems use the public cellular telephone network to connect the handset only when out of range of the local cordless or WLAN network. However, for the purposes of identifying the location of the handset, such an arrangement necessarily uses the infrastructure of the more widely available, but less preferred system. This requires extra signalling traffic over that network, much of it unrelated to calls originating or terminating on that network. Such an arrangement may also prevent services being made available unless they are compatible with the more general network's operating methods. This is particularly inconvenient if the more general system is rarely required—for example because the preferred system is available at the user's habitual location.

It is desirable that calls to and from a dual mode system are routed by the most direct and straightforward way available, and this is not possible if all calls have to be routed by way of the infrastructure of the cellular system, as seen for example by the routes shown by solid lines in FIG. 1 to 5. However, the cellular system needs to remain available as a back-up system for when coverage on the wireless access system is not available. It is desirable to make this availability possible without extensive modification to the cellular network.

The present invention avoids this problem and allows end-to-end internet (broadband) capability by providing a telecommunications switching system comprising first access means for routing communication to and from a mobile terminal by way of a first switched network, and interface means for routing communication to and from the mobile terminal by way of a second switched network, the telecommunications switching system comprising:

a register associated with the first network for recording the network locations of mobile terminals having directory numbers allocated to the register;

switching means for routing incoming connection requests directed to directory numbers allocated to the register, arranged such that if a connection attempt is directed to a number allocated to the register, the switching means accesses the required directory number from the register and, if the mobile terminal is not currently associated with a connection to the first switched network, the switching means attempts to route the connection to the second switched network, and the terminal is recorded by the register as being connected to the second network, and if the mobile terminal is currently associated with a connection to the first switched network, the switching means routes the connection directly by way of the first switched network, the telecommunications switching system being further provided with emulation means for reporting to a location means of the second switched network when the mobile terminal is in communication with the first switched network.

The invention also extends to a method of operating a telecommunications switching system a first switched network and a second switched network, each with respective access means for establishing communication with a mobile terminal, and interface means for routing communication between the first network and the second switched network, the method comprising:

recording the network location of the mobile terminal in a register associated with the first network;

routing incoming connection requests directed to numbers allocated to the register such that:

if the mobile terminal is not currently associated with a connection to the first switched network, the switching means attempts to route the connection to the second switched network, and the terminal is recorded by the register as being connected to the second network, if the mobile terminal is currently associated with a connection to the first switched network, the switching means routes the connection directly by way of the first switched network, and when the mobile terminal is in communication with the first switched network, reporting the location to a location means of the second switched network.

The first system therefore emulates the operation of a network connection such that the second system can take over and relinquish connections to the mobile terminal according to the availability of the first system, but whilst the terminal is working to the first system its operation is transparent to the second system, and the first network can therefore handle calls without any involvement of the second system.

It should be noted that, in contrast to the prior art reference identified above, the second network maintains a location update although control of routing is the responsibility of the first network. This allows separation of the network to which incoming calls are originally routed (the first network) from the default network to which calls are directed if no dedicated connection is available. In the prior art arrangement, the network to which calls were initially routed has to be the default network, which requirement can put constraints on the operation of the connection when in a preferred non-default mode.

This arrangement allows the provision of a second system, such as a cellular system, for use as a default when a preferred system (such as a WLAN) is not available, without the need for either extensive modification of the second network or for operation within the constraints of that network except when actually using it. In particular, the second system will not attempt to force a handover to one of its own base stations if it detects the presence of the mobile unit, because the emulation means is itself arranged to behave as a base station. The emulation means therefore allows each network to interact with the mobile station as if it is the home network for that station.

Figure 6:
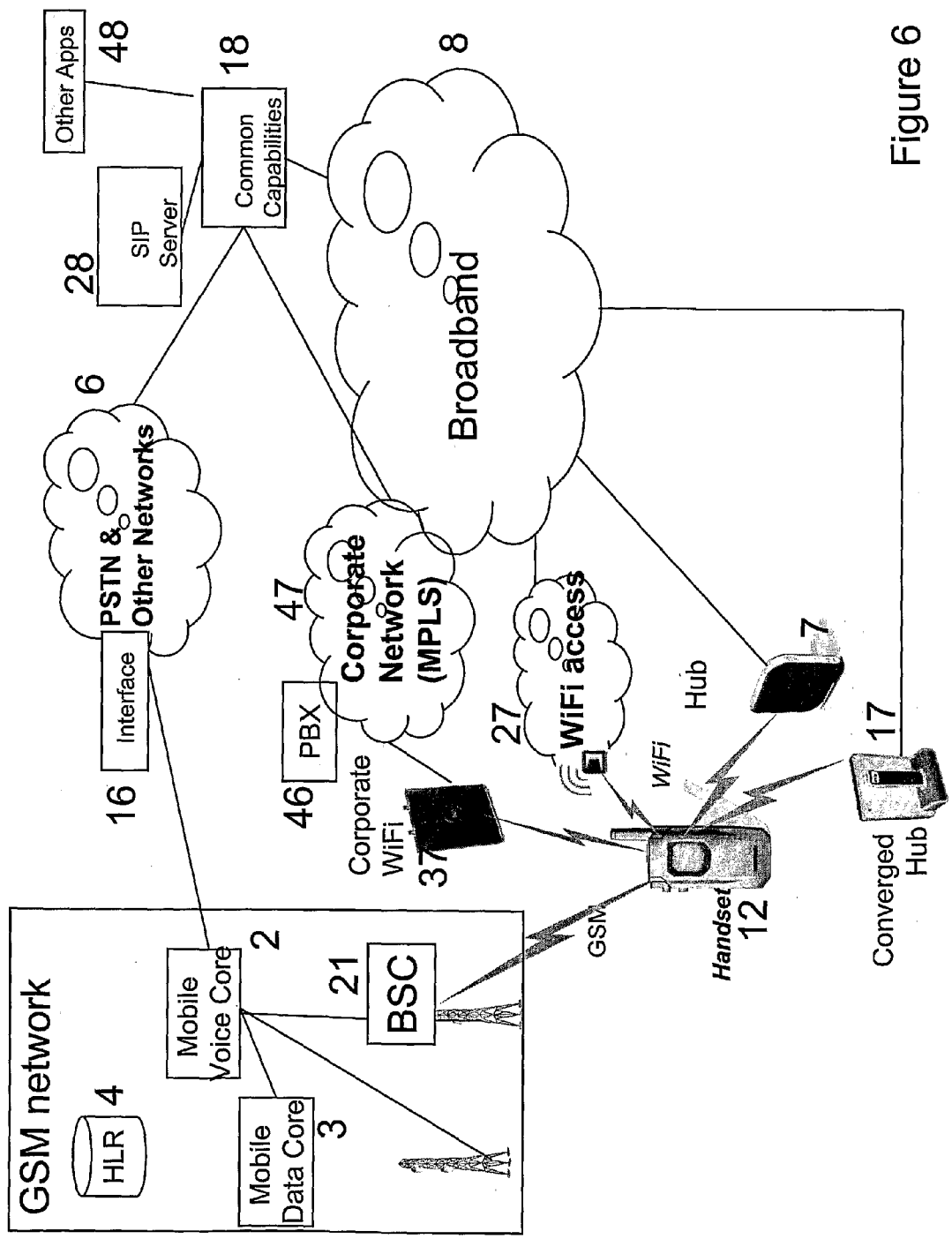
Figure 7:
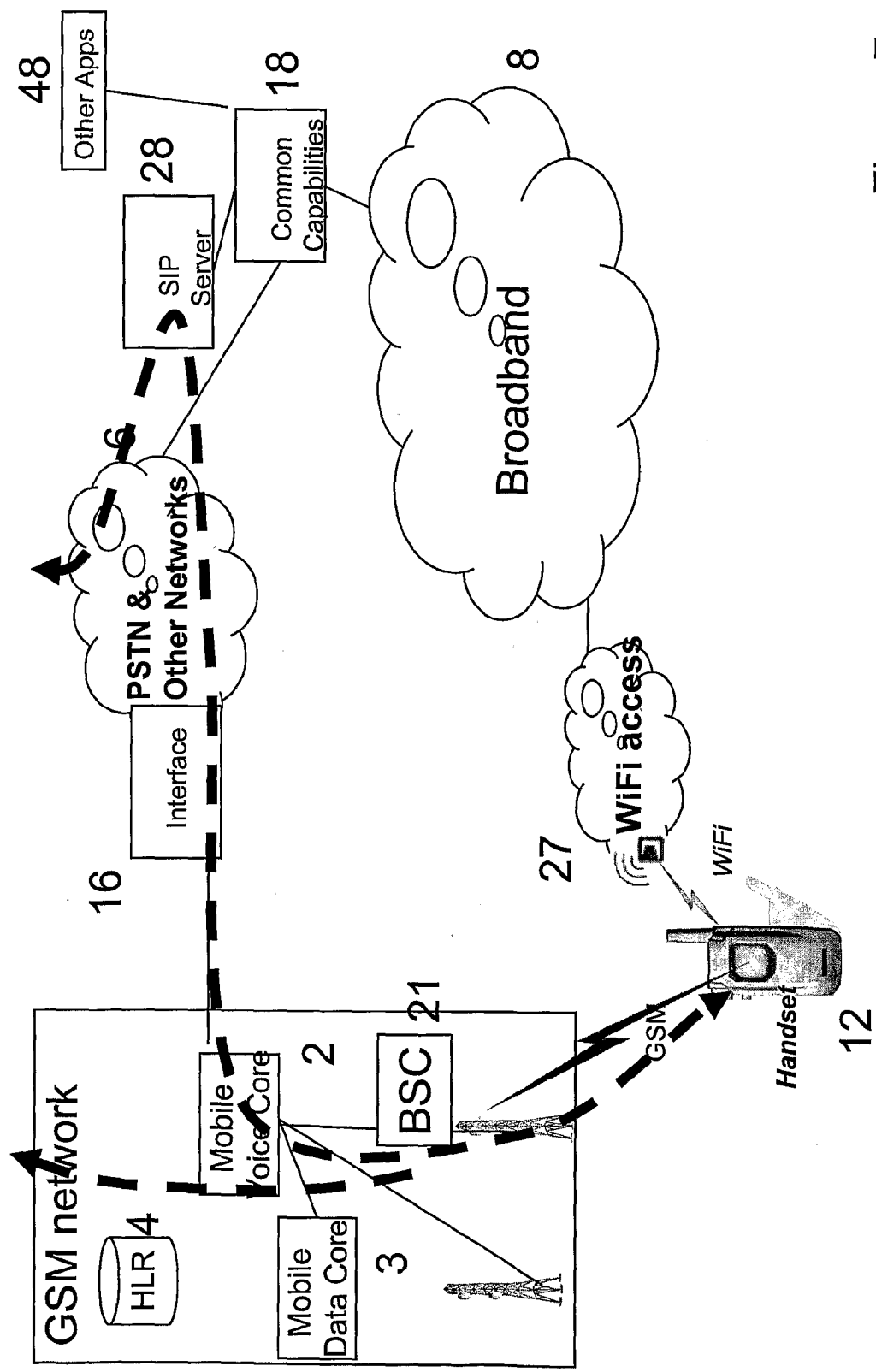
Figure 8:
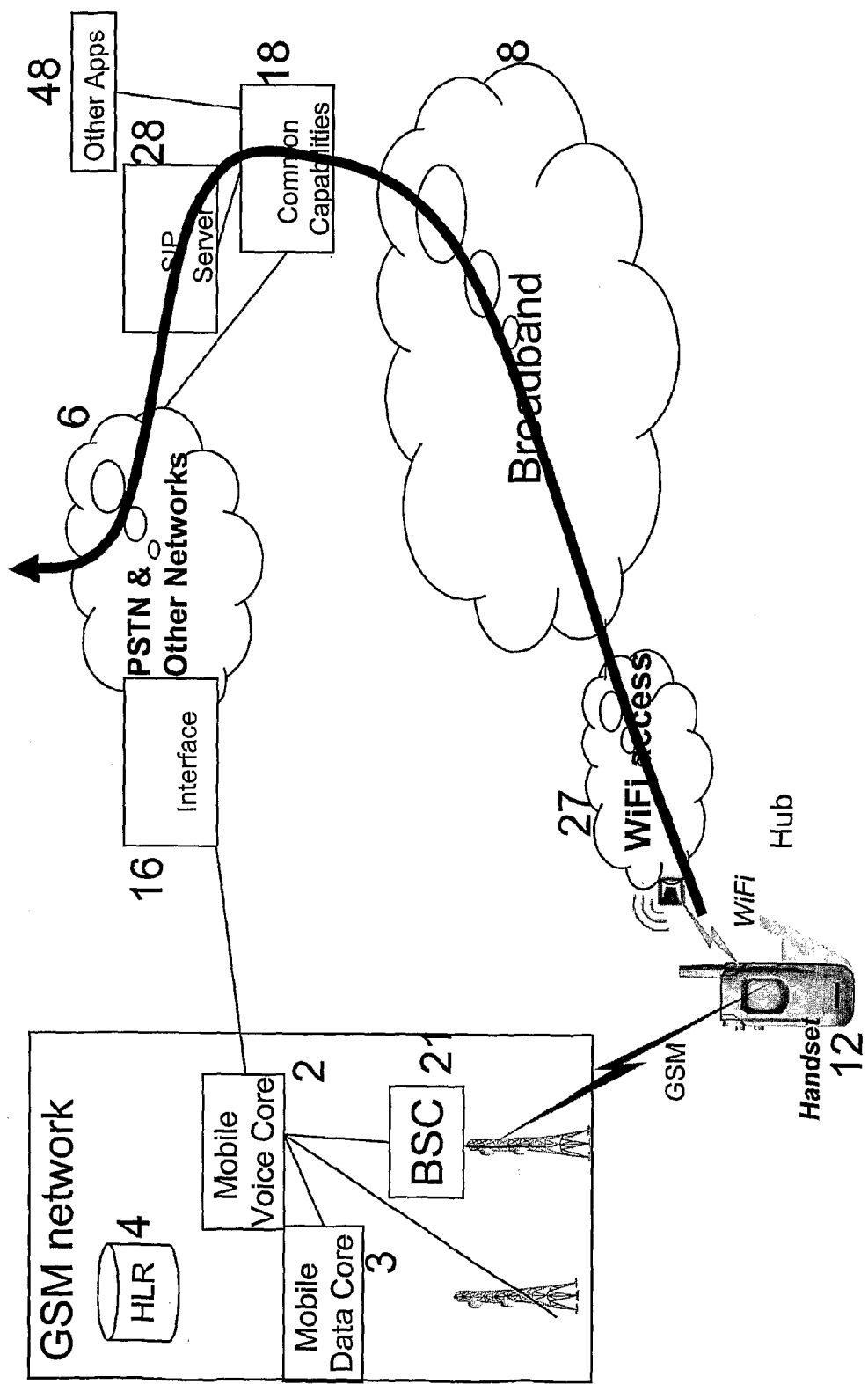
Figure 9:
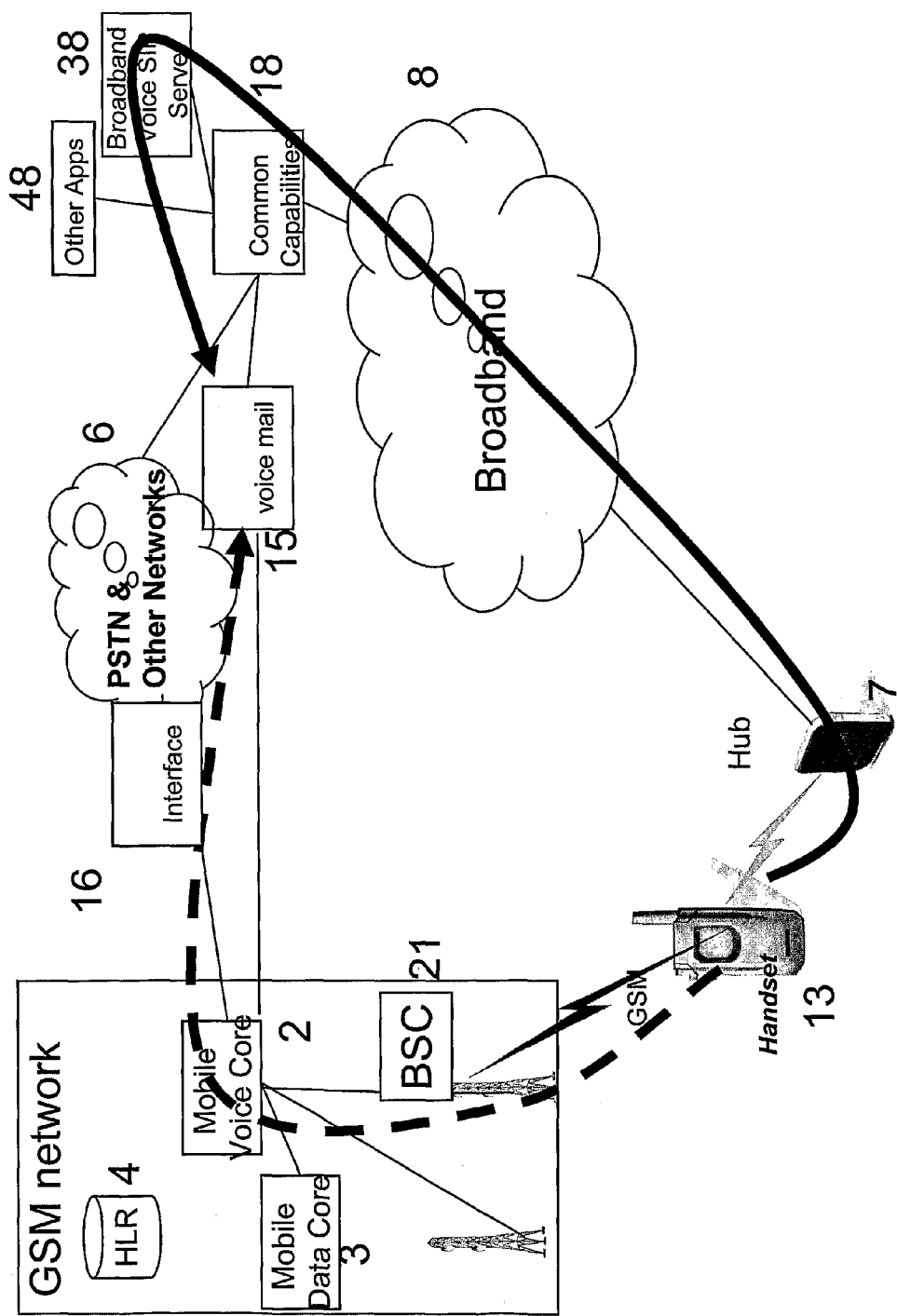
Figure 10:
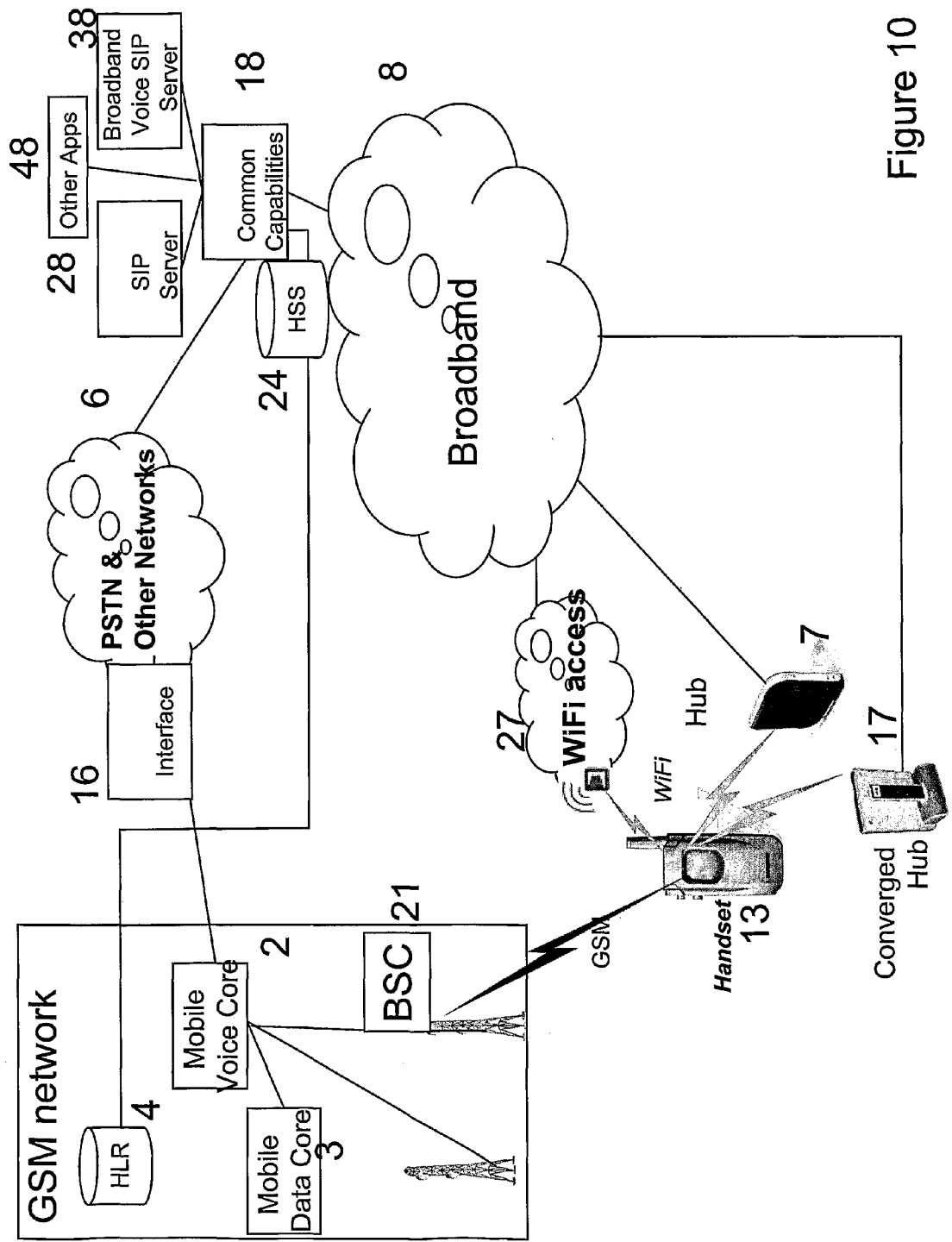

An embodiment of the invention will now be described by way of example, with reference to the attached schematic drawings, in which:

FIG. 6 is a schematic diagram illustrating the general arrangement of a first system operating according to the invention FIG. 7 is a schematic diagram illustrating how a call is connected on the system of FIG. 6 when operating in a cellular mode FIG. 8 is a schematic diagram illustrating how a call is connected on the system of FIG. 6 when operating in a wireless access mode FIG. 9 is a schematic diagram illustrating the operation of a voicemail retrieval service in the system of FIG. 6 when operating in the first wireless access mode, and when operating in the cellular mode FIG. 10 illustrates an alternative configuration to that of FIG. 6, which may be used as an intermediate stage in effecting a transition from the system of FIG. 3 to that of the invention.

As shown in FIG. 6, the fixed network is provided with an internet-based telephony platform 18. This platform allows calls to be connected between the PSTN 6 and the digital packet switched network 8, and provides the necessary protocols such as "Voice over Internet Protocol" (VoIP) to allow interfacing between them. This allows calls from the PSTN 6 to be routed to a dual purpose handset 12 by way of the digital packet switched network 8 and a wireless internet access node 27, as depicted in FIG. 7. (Alternative wireless access modes 7, 17, 37 are also depicted in FIG. 6, but omitted from the other Figures for clarity). Thus a routing for such calls is provided which does not make use of the cellular network 2, 3, 4 and dispenses with the mobile access bridge 9 shown in FIG. 1 to 5. A call server 28 controls the processing of calls in the internet-based telephony platform 18. The platform 18 may also have the capability to support other service applications 48.

In this arrangement, the user handset 12 has a directory number associated with the PSTN 6 rather than the cellular network 2, and so calls directed to the user can be routed to the handset without any involvement of the cellular network, as will be described with reference to FIG. 8. The cellular system 2 is therefore only involved in calls where the "final drop" part of the call requires use of the cellular access system, as will be described with reference to FIG. 7. As with the prior art arrangements, the interface 16 is designed to emulate another cellular network, so that the real cellular system 2 can operate normally, but the home network, in which initial handling of incoming calls is performed, is the fixed network 6.

As shown in FIG. 7, should the handset 12 be out of contact with its associated local wireless access system 27, the handset will seek a hand-over to the cellular network 2, and will become registered as a "roaming" handset currently connected to the cellular network 2. The cellular network 2 reports this location information to the call server 28, as it would to the HLR of any normal visiting handset, so that incoming calls to the PSTN 6 destined for the user 12 can be routed by way of the cellular network, as shown in FIG. 7. Outgoing calls are handled as conventional cellular telephony calls, in the manner shown in FIG. 1.

As shown in FIG. 8, when contact with a local wireless access system 27 is re-established, the contact information is passed to the call server 28, which reports to the cellular network 2 that a handover has occurred. The interface between the call server 28 and cellular network 2 is configured such that the call server 28 emulates a base site controller of the cellular network 2. The cellular network therefore operates conventionally, with the handset 12 logged as operating through this quasi-base site controller. Calls originating within the cellular system 2 which are destined for the user can therefore be routed by the cellular system to the call server 28. No other incoming calls for the handset would be handled by the cellular system 2—they would instead be routed by the call server 28 through the access connection 27. However, the cellular system would continue to register the presence of the handset as co-operating with the quasi-base station 28, even though it would have no visibility of most calls being made to and from the handset.

FIG. 9 is a schematic diagram illustrating the operation of a voicemail retrieval service in the system of FIG. 6. The process by which messages may be stored has already been described with reference to FIG. 5. When the handset is operating in the cellular mode, the retrieval process is similar to the process shown in FIG. 5. However, when the handset is connected to the internet 8 by way of a local wireless access system (here shown as wireless hub 7), retrieval can be achieved by way of the call server 38 without the involvement of the cellular network.

FIG. 10 illustrates an alternative configuration to that of FIG. 6, which may be used as a first stage in effecting a transition from the system of FIG. 3 to that of the invention. This retains user subscription information in the HLR 4 of the cellular network, but this information is exchanged with a home server 24 co-operating with the call servers 28, 38 associated with the internet telephony platform 8. This arrangement allows directory numbers associated with the cellular network 2 to be registered with the internet telephony platform 8, allowing inbound calls to be intercepted at the PSTN 6 and not diverted by way of the cellular network.

The invention claimed is:

1. A telecommunications switching system comprising a local access system for routing communication to and from a mobile terminal by way of a first switched network, and interface means for routing communication to and from the mobile terminal by way of a cellular telephone network, the telecommunications switching system further comprising:
    a register associated with the first network for recording the network locations of mobile terminals having directory numbers allocated to the register;
    switching means for routing incoming requests for a connection directed to directory numbers allocated to the register,
    arranged such that if a connection attempt is directed to a number allocated to the register, the switching means accesses the required directory number from the register and,
    if the mobile terminal is not currently in communication with the first switched network through the local access system, the switching means attempts to establish the requested connection with the cellular telephone network, and the terminal is recorded by the register as being connected to the cellular telephone network, and
    if the mobile terminal is currently in communication with the first switched network through the local access system, the switching means establishes the requested connection directly by way of the first switched network,
    the telecommunications switching system further comprising an interface for reporting to a register of the cellular telephone network when the mobile terminal is in communication with the first switched network through the local access system.

2. A telecommunications switching system according to claim 1, wherein the first switched network provides a connection to a wireless access system.

3. A telecommunications system according to claim 1, wherein the first switched network is a packet switched network.

4. A telecommunications systems according to claim 1, wherein the interface emulates the operation of a base site controller of the cellular telephone network.

5. A telecommunications system according to claim 1, further comprising a message repository accessible from a mobile terminal connected through either the first switched network or the cellular telephone network.

6. A telecommunications system according to claim 1, wherein the registers in the first switched network and the cellular telephone network are both responsive to changes in location of a mobile terminal to generate location updates.

7. A method of operating a telecommunications switching system including a first switched network and a second switched network, each with a respective access unit for establishing communication with a mobile terminal, and an interface for routing communication between the first network and the second switched network, the method comprising:
    recording the network location of the mobile terminal in a register associated with the first network;
    routing incoming requests for a connection directed to numbers allocated to the register such that:
        if the mobile terminal is not currently in communication with the first switched network through a local access system, a switching system attempts to establish the requested connection with the second switched network, and the terminal is recorded by the register as being connected to the second network;
    if the mobile terminal is currently in communication with the first switched network through the local access system, the switching system establishes the requested connection directly by way of the first switched network, and
    when the mobile terminal is in communication with the first switched network through the local access system, reporting the location of the mobile terminal to a register of the second switched network,
    wherein the terminal is connectable to the first switched network through the local access system and the second switched network is a cellular telephone network.

8. A method according to claim 7, wherein the first switched network provides a connection to a wireless access system.

9. A method according to claim 7, wherein the first switched network is a packet switched network.

10. A method according to claim 7, wherein the location is reported to the register by emulating the operation of a base site controller of the cellular telephone network.

11. A method according to claim 7, wherein a message repository associated with the first network is accessible from a mobile terminal connected through either the first or the second switched network.

12. A method according to claim 7, wherein corresponding location updates are generated in both the register in the first switched network and the register in the cellular telephone network responsive to changes in location of a mobile terminal.

* * * * *

UNITED STATES PATENT AND TRADEMARK OFFICE
CERTIFICATE OF CORRECTION

PATENT NO.       : 8,483,126 B2                                                                 Page 1 of 1
APPLICATION NO. : 12/299979
DATED            : July 9, 2013
INVENTOR(S)      : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this
Eighth Day of September, 2015

Michelle K. Lee
*Director of the United States Patent and Trademark Office*